Feb. 2, 1965  E. O. SCHONSTEDT  3,168,696
MAGNETIC FLUX DIRECTING CYLINDRICAL CORE HAVING
A PLURALITY OF SERIALLY ARRANGED INTERRUPTIONS
Filed June 26, 1962

INVENTOR
ERICK O. SCHONSTEDT
BY
ATTORNEY

3,168,696
MAGNETIC FLUX DIRECTING CYLINDRICAL CORE HAVING A PLURALITY OF SERIALLY ARRANGED INTERRUPTIONS
Erick O. Schonstedt, 9170 Brookville Road, Silver Spring, Md.
Filed June 26, 1962, Ser. No. 205,322
7 Claims. (Cl. 324—43)

This invention relates to magnetic field measuring and detecting devices, and consists more particularly in new and useful improvements in a magnetic core for use with such devices, the present invention representing a modification of the core shown and described in my prior U.S. Patent No. 2,981,885, issued April 25, 1961.

As in said prior patent, this invention has particular application to the field of magnetometers and flux-responsive measuring devices, an object being to provide an improved means for measuring the intensity of weak magnetic fields, such as that of the earth, or by measuring currents by vitrue of the magnetic fields produced.

Another object of the invention is to provide a magnetic field measuring device which utilizes low power and which is resistant to becoming permanently magnetized.

A further object of the invention is to provide a magnetic field measuring device possessing many of the advantages of that shown and described in my said prior patent, but wherein the method of manufacture is simplified due to the modified core structure.

Still another object of the invention is to provide a magnetic core comprising a hollow cylinder of permeable magnetic material, having a plurality of wall interruptions spaced at intervals in a preferably etched pattern to establish paths for the fluxes respectively produced by longitudinal and annular magnetic fields, the interruptions being relatively disposed to prevent the flux produced by a longitudinal magnetic field from intersecting at right angles, the flux produced by an annular magnetic field, at any point on the cylinder.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views.

Figure 1:
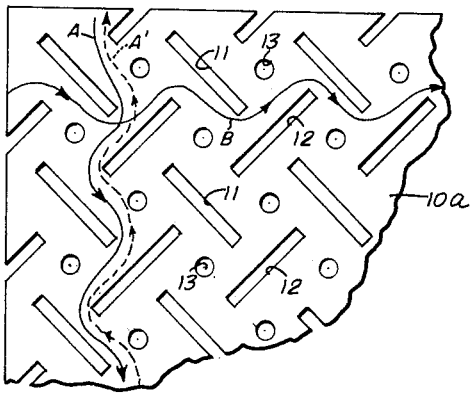
FIGURE 1 is an enlarged fragmentary plan view of an etched sheet of permeable magnetic material, prior to being formed into a cylinder and showing the relationship of the wall interruptions.

Briefly, the essential difference between the present invention and that disclosed in my said prior patent, lies in the construction of the tubular core of the magnetic measuring device. In the earlier invention, the core was formed of two oppositely wound, interwoven strips of permeable material, embracing a central tube of refractory ceramic material, while the core of the present invention is comprised of a relatively thin cylinder of magnetically permeable material having a series of wall interruptions spaced to interrupt the flux paths.

In conventional magnetic field measuring devices, the requirement for low power consumption has been met by employing a magnetometer core consisting of a thin tube of easily permeable material such as Permalloy, provided with a toroidal winding in which the windings are parallel with the long axis of the core. Through this winding is passed an alternating current of sufficient magnitude to cause the alternating magnetic field associated with the current to cyclically drive the core into saturation. A second winding surrounding the core is so arranged that its axis is parallel with the long axis of the core.

Second harmonic voltages are generated in this second winding when there is a magnetic field acting on the core, so as to magnetize the core in a direction parallel with its length and this second harmonic voltage generation is achieved in the following manner. The magnetic field associated with the current passing through the electrical conductor of the first winding is annularly disposed about the conductor. This magnetic field then acts to magnetically saturate the tubular core in a circumferential direction during the peak position of the current cycle, the duration of this circumferential magnetization depending on whether the current is in its positive or negative path of its cycle. The magnetic field to be measured, however, magnetizes the core along its length.

At the instant during the current cycle when the A.C. magnetic field is zero, there exists a maximum amount of longitudinal magnetic flux produced by the field to be measured However, as the A.C. flux increases and the core is driven into saturation in a circumferential direction, the longitudinal flux is reduced to essentially zero. With the decrease of the A.C. magnetic flux, the longitudinal flux increases and again becomes a maximum when the A.C. field is zero. The same situation occurs during the increase of the A.C. magnetizing field. Hence, there is generated an alternating flux parallel with the axis of the core which has twice the frequency of the A.C. magnetizing field. The longitudinal flux cuts the second winding surrounding the core so as to generate second harmonic frequency voltages therein.

As pointed out in my prior patent, this arrangement has the advantage of low power consumption, but conventional structures have the disadvantages of becoming permanently magnetized by the field acting longitudinally along the core which results from the fact that the A.C. magnetizing flux acts at right angles to the flux produced by the field to be measured and hence a small residual longitudinal flux remains which is not shaken out by the A.C. magnetizing field.

This tendency to become permanently magnetized was eliminated in the invention of the prior patent by constructing the core from two oppositely wound interwoven strips of permeable material, so wound that small diamond-shaped metal-free spaces are formed, one for each half convolution of the two strips. The strips thus broadly defined a hollow metal cylinder or tube with a series of holes. However, it has been found that the manufacture of a tubular core from two strips as above referred to requires a high degree of skill in order to interweave the strips uniformly.

The present invention embraces a means for achieving similar results to those obtained with the interwoven strip method, by employing an integral core composed of a cylinder of permeable material having relatively thin, substantially uniform wall thickness throughout and provided with a series of wall interruptions or openings relatively arranged to divert the magnetic fluxes.

Figure 2:
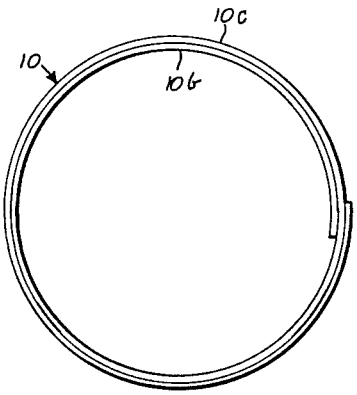
FIGURE 2 is an enlarged end view of one form of cylinder comprising the core.
Figure 3:
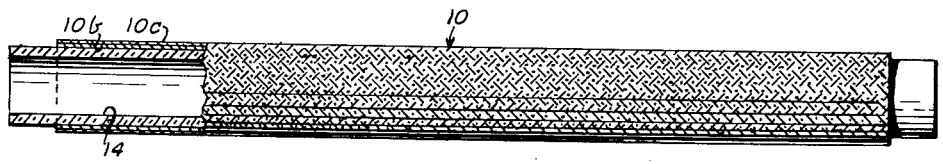
FIGURE 3 is a reduced plan view partially broken away, illustrating the construction of the core.

In the drawings which are greatly enlarged for illustrative purposes, in the preferred form of the invention, represents a thin cylinder of magnetically permeable material formed of a foil-like sheet 10a rolled upon itself in preferably two laminations 10b and 10c, as shown in FIGURE 2. This sheet of magnetically permeable material has an etched pattern extending throughout its surface which, as shown in FIGURE 1, comprises a series of parallel, diagonally disposed slots 11 arranged in longitudinally aligned rows in spaced relation, and a series of rows of parallel, diagonally, oppositely disposed slots 12. Each of the slots of these respective rows is arranged at right angles to the adjacent slots of the next row and is arranged substantially mid-way between the extremities of adjacent slots on either side thereof. Thus, the extremities of any slot intersect an imaginary straight line extending through the adjacent extremities of the slots in the row on either side. As will be seen in FIGURE 1, the staggered slots 11 and 12 are arranged to interrupt the respective paths of the fluxes produced by longitudinal and annular magnetic fields, causing said flux paths to follow a staggered or zigzag course, while preventing such paths from intersecting one another at right angles.

To further insure against right angular intersection of the flux paths, it is preferable to additionally etch a series of perforations 13 arranged in longitudinally spaced rows and respectively disposed midway between the etched slots of each row. Thus, each conducting area between any row of slots 11 or 12 in either direction, is centrally interrupted by the intervening apertures 13.

Figure 6:
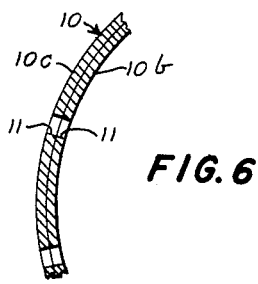
FIGURE 6 is an enlarged fragmentary sectional view through a portion of the cylinder.

In the form of cylinder shown wherein the sheet 10a of permeable material is rolled upon itself it two layers, the wall thickness should be approximately .000125 inch, and the cylinder can be prevented from unrolling by careful spot welding at selected points. In the rolling of this etched sheet, it is important that corresponding diagonal slots and apertures in the rows of respective laminations 10b and 10c register with one another as shown in FIGURE 6, so as to maintain the arrangement or pattern of wall interruptions, as and for the purpose hereinafter set forth.

Figure 4:
FIGURE 4 is a further reduced plan view of a subassembly of the measuring device.

In adapting the core of the present invention for magnetometer use, the cylinder 10 is mounted on an inner tube 14 of a suitable highly refractory ceramic material, projecting from opposite ends of the cylinder to receive a pair of peripherally slotted plastic ferrules or sleeves 15 and 16, which fit over the opposite ends of the inner tube 14 as shown in FIGURE 4, in abutting relation to the corresponding ends of the cylinder 10. The diameters of the ferrules 15 and 16 are sufficiently greater than that of the cylinder 10, to radially offset the outer peripheries of the ferrules with respect to the cylinder to permit the radial spacing of a toroidal excitation winding 17 about the core. This winding may be made of insulated copper wire which passes over the exterior of the cylinder 10 in radially spaced relation thereto, and threaded longitudinally through the interior of the ceramic tube 14, the winding being retained in place by the longitudinal, circumferentially spaced slots 15a and 16a in the ferrules 15 and 16, respectively. Each slot 15a, 16a may receive five turns, for example, and the turns may be wound one after another in one slot, then wound successively in the next slot, and so on, the ends 18 of the winding being preferably twisted together at one end of the core and then threaded through the inner tube 14 and pulled out of the opposite end to prevent loosening, in the same manner as shown in my said prior patent.

As will later appear, this winding 17 carrying an electrical current, produces an annular flux about the axis of the core.

Figure 5:
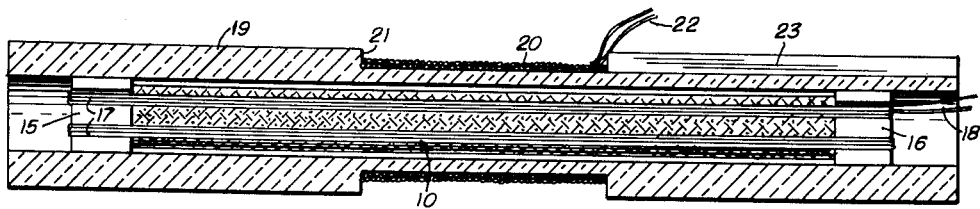
FIGURE 5 is a longitudinal sectional view of the assembled measuring device including the core of the present invention.

For purposes of illustration, the embodiment of the present invention may be as shown in FIGURE 5, generally similar to that disclosed in my said prior patent. Here it will be seen that the assembly including the core or cylinder 10 and the coil 17, is inserted in a plastic tube 19, which may receive the assembly fairly snugly. A pick-up winding 20, comprising numerous turns of insulated copper wire wound in one or more helical layers about the axis of the tube 19, is applied to the periphery of the tube, preferably lying in an annular recess 21. The ends 22 of the winding 20 may pass through a longitudinal slot 23 formed in the surface of the tube 19.

In operation, the annular flux produced by the excitation winding 17 at a given instant is represented by the arrows A shown in FIGURE 1. The longitudinal flux produced by the field to be measured is denoted by the arrows B. It will be seen that the flux represented by arrows A is deflected from a strictly annular path by the alternately intersecting slots 11 and 12 and apertures 13, causing the fluxes to follow substantially zigzag paths.

During the reversal stage of the excitation flux, the direction of flux A is reversed as shown by the dotted arrows A' in FIGURE 1. Hence, the slots 11 and 12 act to introduce fluxes which have components directly opposing the fluxes produced at B.

As in the case of my prior patent, the ratio of the two general types of fluxes, that is, longitudinal and annular, can be regulated to some extent by varying the size of the slots 11 and 12.

The flux produced by a magnetic field, such as that of the earth, will be parallel with the core in longitudinal elements of the core free from slots 11 and 12, and will be diverted from parallelism by these slots in other parts of the core. In either situation, the A.C. excitation flux has components which, during a complete cycle, either aid or oppose the flux produced in the core by the earth's field so as to shake out any tendency of the core to become permanently magnetized.

From the foregoing, it is believed that the invention may be understood by those skilled in the art without further description, it being borne in mind that numerous changes may be made in the details disclosed without departing from the spirit of the invention as set forth in the following claims.

I claim:

1. A magnetic core comprising a hollow cylinder of permeable magnetic material, said cylinder being of one piece construction and having a plurality of spaced surface interruptions arranged in two separate series of diagonal rows, respectively extending around said cylinder in substantially diametrically opposite directions, the interruptions in the rows of each series being interposed between adjacent spaced interruptions in corresponding rows of the other series, in spaced, angular relation thereto, defining therewith, on the surface of said cylinder, the respective boundaries of two sets of staggered, intersecting paths for the fluxes respectively produced by a longitudinal and an annular magnetic field, the interruptions of each row of each series lying substantially crosswise to the direction of travel of said fluxes along respective paths, to divert said fluxes and prevent the flux produced by a longitudinal magnetic field from intersecting at substantially right angles, the flux produced by an annular magnetic field, at any point on said cylinder.

2. A magnetic core comprising a hollow cylinder of permeable magnetic material, its wall having a series of rows of longitudinally spaced diagonal slots, the slots of respective rows being parallel with one another and diagonally opposite and at right angles to those of adjacent rows, with the extremities of the slots of each row spaced from the slots of adjacent rows and intersecting imaginary parallel lines passing through the respective extremities of the diagonally opposite slots of the rows on either side thereof, whereby to establish paths on said cylinder, for the fluxes respectively produced by longitudinal and annular magnetic fields, and to prevent the path of the flux produced by a longitudinal magnetic field from intersecting at substantially right angles, the path of the flux produced by an annular magnetic field, at any point on said cylinder.

3. A magnetic core as claimed in claim 2, including a series of apertures respectively located in the wall of said cylinder, midway between any four adjacent slots, to thereby provide additional flux path interruptions.

4. A magnetic core as claimed in claim 2, wherein said cylinder is formed of a sheet of foil-like permeable magnetic material rolled upon itself to form laminations, the slots of corresponding rows in respective laminations being arranged in alignment in any cross-section of said cylinder.

5. A magnetic core as claimed in claim 3, wherein said cylinder is formed of a foil-like sheet of permeable magnetic material rolled upon itself to form laminations, the slots and apertures of corresponding rows in respective laminations being arranged in alignment in any cross-section of said cylinder.

6. A magnetic core and winding assembly, comprising a non-magnetic hollow tubular form, a one-piece cylinder of permeable magnetic material embracing said form, said cylinder having a plurality of wall interruptions spaced at intervals and angularly disposed to collectively define the borders of staggered intersecting paths for the fluxes respectively produced by longitudinal and annular magnetic fields, said interruptions being relatively disposed to divert the fluxes and prevent the flux produced by a longitudinal magnetic field from intersecting at substantially right angles, the flux produced by an annular magnetic field at any point on said cylinder, coaxial winding support means radially offset from the periphery of said cylinder for spacing turns of wire from the latter, and a plurality of turns of wire wrapped longitudinally over said winding support means and through said tubular form.

7. A magnetic core and winding assembly as claimed in claim 6, including a second non-magnetic form surrounding said winding, said second form supporting an additional winding with turns of the additional winding substantially perpendicular to the turns of the first-mentioned winding.

References Cited in the file of this patent
UNITED STATES PATENTS

| | | |
|---|---|---|
| 786,396 | Adams | Apr. 4, 1905 |
| 2,423,869 | Blessing | July 15, 1947 |
| 2,981,885 | Schonstedt | Apr. 25, 1961 |